Patented May 24, 1938

2,118,663

UNITED STATES PATENT OFFICE 2,118,663

PURIFICATION OF CELLULOSE ETHERS

Russell R. Bradshaw, Midland, Mich., assignor to The Dow Chemical Company, Midland, Mich., a corporation of Michigan No Drawing. Application March 25, 1937, Serial No. 133,087

12 Claims. (Cl. 260—152)

This invention relates to an improved process for the purification of cellulose ethers.

When cellulose ethers are prepared according to any of the known procedures, the crude product obtained from the etherification step, if dissolved in the usual solvents for such ethers, forms a solution which frequently has an undesirable color and a marked turbidity. The presence of insufficiently etherified material is evidenced by cloudy or murky suspensions which also contain compounds of iron, nickel, copper, or other heavy metals which impart undesirable color to solutions of cellulose ethers if allowed to remain dissolved in, occluded on, or combined with the cellulose ether. Films formed therefrom are characterized not only by objectionable colors, but also by a reduction in transparency generally referred to as "haze". Methods of purification, which have been proposed, cause partial degradation of the ether, as well as a material change in the viscosity thereof. It is frequently difficult to control the purification in such a manner that a product capable of forming a solution of any predetermined viscosity can be obtained.

An object of the invention is to provide a process whereby crude cellulose ethers may be purified without degradation of the ether, to yield a product of substantially the same viscosity as the crude cellulose ether.

Material degradation of the complex cellulose ether molecule occurs when crude cellulose ethers are treated with mineral acids. Mineral acids are, however, useful reagents for the removal of metal salts from cellulose ether compositions. Applying the method disclosed in my copending application, Serial No. 119,523, filed January 7, 1937, a very substantial improvement is obtained in the color characteristics of films produced from cellulose ethers, when the crude ethers are treated with aliphatic carboxylic acids.

I have now found that the desirable characteristics of mineral acids, when applied to the purification of cellulose ethers, may be used advantageously without encountering any of the undesirable results which ordinarily accompany such treatment. This end is achieved by treating a solution of a crude cellulose ether with a strong mineral acid, said acid being modified in its effect by the further addition of one or more aliphatic carboxylic acids. This totally unexpected result is obtained even though very small quantities of the organic acid and of mineral acid are employed. The aliphatic carboxylic acids do not interfere with the normal action of the mineral acid in extracting metal salts from the cellulose ethers, nor does the presence of mineral acid hinder the clarifying action of the carboxylic acids. The mixed mineral acids and aliphatic carboxylic acids, in the present process, effectively purify crude cellulose ethers and result in the formation of an undegraded ether product as evidenced by viscosity measurements and by stability tests. The aliphatic carboxylic acids which are particularly effective in the process are those having an ionization constant of the order of magnitude of about $10^{-3}$ or smaller. Following is a list of a few aliphatic carboxylic acids which are suitable for the purpose of the invention, together with the ionization constants thereof. In those cases in which more than one constant appears, the first designates the ionization constant of the first stage of ionization and succeeding numbers refer to the ionization of the remaining carboxylic groups present.

| Acetic acid | | $1.86 \times 10^{-3}$ |
| Chloro acetic acid | | $1.0 \times 10^{-3}$ |
| Citric acid | (1) | $8.2 \times 10^{-4}$ |
| | (2) | $5 \times 10^{-5}$ |
| | (3) | $3 \times 10^{-6}$ |
| Formic acid | | $2 \times 10^{-6}$ |
| Lactic acid | | $1.55 \times 10^{-4}$ |
| Succinic acid | (1) | $6.5 \times 10^{-5}$ |
| | (2) | $5.9 \times 10^{-6}$ |
| Tartaric acid | (1) | $9.7 \times 10^{-4}$ |
| | (2) | $9 \times 10^{-5}$ |

For the purpose of comparison, it may be stated that the ionization constant of dilute hydrochloric acid is substantially equal to unity. The preferred acids are those of the type illustrated, and which do not contain substituents reactive with the cellulose ether or with a solvent therefor.

In a preferred method of carrying out the invention, a crude cellulose ether is mixed with a solvent therefor, and is treated with a small amount of dilute mineral acid and a small amount of an aliphatic carboxylic acid. The mixture is agitated for several minutes to effect complete reaction of the various agents present, and the solution is then carefully neutralized with alkali. The purified cellulose ether is subsequently recovered, suitably by diluting the neutralized product with water to precipitate the ether, which is separated by the filtration. The so separated cellulose ether is washed carefully with pure water until the washings are neutral and free from mineral acid anions, and then dried. The carboxylic acid reagent used may be employed in any desired dilution, but for convenience and to avoid the possibility of prematurely precipitating ethyl cellulose, it is ordinarily employed in the form of a concentrated solution and in an amount ordinarily in the range from about 0.25 part to about 2.5 parts by weight of acid per part of crude ethyl cellulose, substantially as described in my aforesaid copending application, Serial No. 119,523.

A modification of the above process, which has been found to be especially effective, comprises mixing a crude cellulose ether with a solvent therefor and adding between about 0.25 and about 2.5 parts by weight of an aliphatic carboxylic acid per part of the cellulose ether. The solution is then agitated and filtered. Unetherified and partially etherified cellulose fibers are made readily filterable by this preliminary acid treatment. To the clear filtrate is added a small amount of dilute mineral acid and, if desired, a small amount of a second carboxylic acid having an ionization constant lower than $10^{-3}$. Thereafter the process is that described above.

A very small amount of mineral acid suffices to produce the desired effect in the present process. For example, it has been found that, when hydrochloric acid is used, an amount of 12 per cent hydrochloric acid equal to 0.5 per cent of the weight of the dissolved cellulose ether is sufficient. Where large amounts of metal salts and other impurities are present, correspondingly larger amounts of the mineral acid may be employed, but it has not been found necessary to employ more of the 12 per cent hydrochloric acid than 5 per cent of the weight of the cellulose ether to accomplish the desired purification. If the mineral acid is employed without an aliphatic carboxylic acid, material degradation of the cellulose derivative invariably results. This degradation is substantially, if not completely, eliminated when purification is accomplished through the co-action of a mineral acid and a single aliphatic carboxylic acid, especially where the concentration of mineral acid is quite low, and appears to be entirely eliminated when two aliphatic carboxylic acids are used as heretofore described.

For purposes of comparison between solutions of ethyl cellulose in the following examples, I have established a series of arbitrary color standards, wherein the number 1 serves to designate a water-white solution and succeeding numbers refer to solutions having color in increasing intensity, the number 10 indicating a solution having a very pale yellow-brown, yellow-green, or slate coloration similar in intensity to the lower end of the standard "caramel" color scale used by lacquer manufacturers. Numerals from 1 to 5 designate the color characteristics of solutions which will give films entirely satisfactory for most industrial applications, while the numerals 1 to 3 refer to solutions meeting the most exacting requirements. The cellulose ether solutions used for the determination of color and of viscosity characteristics, and hereinafter referred to as "standard solutions", were prepared by dissolving 5 per cent by weight of the cellulose ether in a mixture of 33 parts by volume of methyl alcohol and 67 parts by volume of benzene.

Example 1

To 1 liter of a 10 per cent solution of ethyl cellulose in 95 per cent ethanol was added 50 grams of glacial acetic acid and 10 grams of a 12 per cent aqueous solution of hydrochloric acid. The solution was thoroughly mixed at room temperature, filtered, and the ethyl cellulose was precipitated by pouring the filtrate slowly into boiling water. The alcohol was flashed off from the mixture and the ethyl cellulose was recovered by filtration, washed and dried. A standard solution of the purified product had a color of 1+, and a viscosity of 17 centipoises. The tensile strength of a foil deposited from a solution of the purified product was 457 kilograms per square centimeter of original cross section, the foil was capable of elongation to the extent of 6.4 per cent, and was entirely free from haze.

A standard solution of the untreated ethyl cellulose employed in the foregoing example had a viscosity of 20 centipoises, a color of 4+, and formed hazy films, the tensile strength of which was 450 kilograms per square centimeter of original cross section, and which were capable of 12 per cent elongation.

Example 2

50 grams of lactic acid and 10 grams of 12 per cent sulphuric acid were substituted for the acetic acid and hydrochloric acid, respectively, employed in Example 1. The solution was agitated and the ethyl cellulose recovered as above. A standard solution of the purified product had a viscosity of 16 centipoises, a color of 1+, and films produced therefrom were haze-free, had a tensile strength of 483 kilograms per square centimeter of original cross section, and were capable of elongation to the extent of 6.4 per cent.

Example 3

50 grams of 85 per cent formic acid and 5 grams of 85 per cent phosphoric acid were substituted for the lactic acid and sulphuric acid employed in Example 2. The ethyl cellulose was recovered as before, and a standard solution thereof had a viscosity of 13.5 centipoises and a color of 1+, and deposited films having a tensile strength of 457 kilograms per square centimeter of original cross section and capable of elongation to the extent of 6.6 per cent.

Example 4

Crude ethyl cellulose, whose standard solution had a color of 7, a viscosity of 19 centipoises, and which formed a hazy film, was dissolved in 95 per cent ethyl alcohol to make a 10 per cent solution, and was treated with 1.35 parts of an 85 per cent solution of formic acid per part of the crude ethyl cellulose. The resulting mixture was agitated at room temperature and filtered to remove the suspended matter. The clear filtrate was treated with an amount of 12 per cent hydrochloric acid equivalent to 0.0006 gram of hydrogen chloride per gram of ethyl cellulose and with 0.02 gram of tartaric acid per gram of ethyl cellulose. This mixture was agitated to intermix the various agents thoroughly. It was then carefully neutralized with ammonium hydroxide to a pH value slightly greater than 7. The solution was then run slowly into somewhat more than twice its volume of boiling water, whereby the alcohol was flashed off as vapor and was condensed and recovered. The ethyl cellulose, which precipitated immediately upon contact with the boiling water, was separated and washed with pure water to remove all traces of chlorides, and finally dried. A standard solution of the purified product had a color of 4, a viscosity of 19 centipoises and a clear film having a tensile strength equal to that of the film produced from the crude ethyl cellulose, thus showing no degradation as a result of the purification.

Various modifications of the foregoing procedure have been found satisfactory. For example, the desired amount of acid reagent may be dissolved in sufficient alcohol to dissolve the batch of cellulose ether to be purified. This acid-alcohol may be placed in a suitable container and the crude ethyl cellulose discharged directly thereinto from the reaction vessel in which etherification occurred. The resulting solution may be agitated, filtered, and subsequently treated as described in the foregoing example. The clear filtrate may be mixed with water to precipitate the purified cellulose ether, and the solvent subsequently recovered by distillation.

If desired, all of the acid reagents to be used in a given purification may be mixed and added at one time to the substantially non-aqueous solvent, or to a solution of a cellulose ether therein.

Solvents for cellulose ethers other than ethyl alcohol may be employed, for example, methyl alcohol, isopropyl alcohol or mixtures of these with ethyl alcohol; the alkyl ethers such as ethyl ether or isopropyl ether; and the esters such as ethyl acetate, butyl acetate, and the like or mixtures of the foregoing, particularly those comprising an aliphatic alcohol. The preferred solvents are those which will dissolve cellulose ethers, and which are miscible with, or a solvent for, aliphatic carboxylic acids or alcoholic solutions of these acids and whose boiling points are not substantially higher than that of water.

The amount of acid reagents used in the process may vary widely from batch to batch, depending to a large extent upon the amount of impurities present. Although I have ordinarily used amounts of acid ranging from about 0.25 part to about 2.5 parts per part of cellulose ether in the first stage of the process and amounts of mineral acid varying between about 0.0005 and about 0.05 part per part of cellulose ether, together with between about 0.01 and about 0.25 part of a second aliphatic carboxylic acid per part of cellulose ether, lesser or greater amounts of any or all of these acids may be employed as required.

Except for the step of recovering the solvent and precipitating the purified cellulose ether, which may be carried out at or near the boiling point of water, all of the steps of the herein-described process are suitably carried out at room temperature, but higher temperatures, up to the boiling point of the solvent, may also be used. The time required to effect purification is ordinarily from 2 to 20 minutes.

My process may be applied to the treatment of methyl, ethyl, propyl, butyl, ethyl propyl, ethylbenzyl, or other lower alkyl or mixed alkyl-aryl ethers of cellulose.

Other modes of applying the principle of my invention may be employed instead of those explained, change being made as regards the process herein disclosed, provided the step or steps stated by any of the following claims or the equivalent of such stated step or steps be employed.

I therefore particularly point out and distinctly claim as my invention:—

1. In a process for the purification of a crude cellulose ether, the step which consists in treating the same in a solvent therefor with between about 0.25 and 2.5 parts of an aliphatic carboxylic acid having an ionization constant less than $10^{-3}$, and between about 0.0005 part and about 0.05 part of a mineral acid selected from the group consisting of hydrochloric, sulphuric and phosphoric acids, per part of the cellulose ether.

2. In a process for the purification of a crude cellulose ether, the steps which consists in mixing the same in a solvent therefor with an aliphatic carboxylic acid, thereafter removing filterable impurities from the solution, adding to the filtrate a mineral acid selected from the group consisting of hydrochloric, sulphuric and phosphoric acids and a second aliphatic carboxylic acid, mixing the resulting solution with water, and recovering the cellulose ether thereby precipitated.

3. In a process for the purification of a crude cellulose ether, the steps which consist in mixing the same in a substantially non-aqueous solvent therefor with between about 0.25 part and about 2.5 parts by weight of an aliphatic carboxylic acid per part of the cellulose ether, thereafter removing filterable impurities from the solution, adding to the filtrate between about 0.0005 part and about 0.05 part of a mineral acid selected from the group consisting of hydrochloric, sulphuric and phosphoric acids per part of the cellulose ether, and between about 0.01 and about 0.25 additional part of an aliphatic carboxylic acid per part of the cellulose ether, treating the resulting solution with water, and recovering the cellulose ether thereby precipitated.

4. In a process for the purification of a crude cellulose ether, the steps which consist in mixing the same, in a substantially non-aqueous solvent therefor, with an aliphatic carboxylic acid, thereafter removing filterable impurities from the solution, adding to the filtrate a mineral acid selected from the group consisting of hydrochloric, sulphuric and phosphoric acids and a second aliphatic carboxylic acid having an ionization constant less than $10^{-3}$, neutralizing the solution, treating the resulting solution with water, and recovering the cellulose ether thereby precipitated.

5. In a process for the purification of a crude cellulose ether, the steps which consists in mixing the same in a substantially non-aqueous solvent therefor, with between about 0.25 and about 2.5 parts by weight of formic acid per part of the cellulose ether, thereafter removing filterable impurities from the solution, adding to the filtrate between about 0.0005 and about 0.05 part of hydrochloric acid per part of cellulose ether and between about 0.01 and about 0.25 part of tartaric acid per part of the cellulose ether, subsequently neutralizing the solution, treating the resulting solution with water, and recovering the cellulose ether thereby precipitated.

6. In a process for the purification of an ethyl cellulose, the steps which consist in mixing the same with ethanol and adding between about 0.25 and about 2.5 parts by weight of acetic acid and between about 0.0005 part and about 0.05 part of hydrochloric acid per part of the cellulose ether, thereafter removing filterable impurities from the solution, treating the resulting filtrate with water, and recovering the ethyl cellulose thereby precipitated.

7. In a process for the purification of an ethyl cellulose, the steps which consist in mixing the same with ethanol and adding between about 0.25 and about 2.5 parts by weight of lactic acid and between about 0.0005 part and about 0.05 part of sulphuric acid per part of the cellulose ether, thereafter removing filterable impurities from the solution, treating the resulting filtrate with water, and recovering the ethyl cellulose thereby precipitated.

8. In a process for the purification of an ethyl cellulose, the steps which consist in mixing the same with ethanol and adding between about 0.25 and about 2.5 parts by weight of formic acid and between about 0.0005 part and about 0.05 part of phosphoric acid per part of the cellulose ether, thereafter removing filterable impurities from the solution, treating the resulting filtrate with water, and recovering the ethyl cellulose thereby precipitated.

9. In a process for the purification of crude ethyl cellulose, the steps which consist in mixing the same in a substantially non-aqueous solvent therefor with an aliphatic carboxylic acid, thereafter removing filterable impurities from the solution, adding to the filtrate a mineral acid selected from the group consisting of hydrochloric, sulphuric and phosphoric acids and a second aliphatic carboxylic acid, treating the resulting solution with water maintained at a temperature above the boiling point of the solvent, thereby flashing off the solvent and precipitating the ethyl cellulose, and recovering the precipitated ethyl cellulose.

10. In a process for the purification of a crude ethyl cellulose, the steps which consist in mixing the same in a substantially non-aqueous solvent therefor, with an aliphatic carboxylic acid, thereafter removing filterable impurities from the solution, adding to the filtrate a mineral acid selected from the group consisting of hydrochloric, sulphuric and phosphoric acids and a second aliphatic carboxylic acid having an ionization constant less than $10^{-3}$, neutralizing the solution, treating the resulting solution with water, and recovering the cellulose ether thereby precipitated.

11. In a process for the purification of a crude ethyl cellulose, the steps which consist in mixing the same in a substantially non-aqueous solvent therefor with between about 0.25 part and about 2.5 parts by weight of an aliphatic carboxylic acid per part of the cellulose ether, thereafter removing filterable impurities from the solution, adding to the filtrate between about 0.0005 part and about 0.05 part of a mineral acid selected from the group consisting of hydrochloric, sulphuric and phosphoric acids per part of the cellulose ether, and between about 0.01 and about 0.25 additional part of an aliphatic carboxylic acid per part of the cellulose ether, treating the resulting solution with water, and recovering the cellulose ether thereby precipitated.

12. In a process for the purification of crude ethyl cellulose, the steps which consist in mixing the same in alcoholic solution with between about 0.25 part and about 2.5 parts by weight of formic acid per part of ethyl cellulose, thereafter removing filterable impurities from the solution, adding to the filtrate between about 0.0005 part and about 0.05 part of hydrochloric acid per part of ethyl cellulose and between about 0.01 and about 0.25 part of tartaric acid per part of the ethyl cellulose, treating the resulting solution with water, and recovering the ethyl cellulose thereby precipitated.

RUSSELL R. BRADSHAW.